United States Patent
Wilson et al.

(10) Patent No.: US 10,766,171 B2
(45) Date of Patent: Sep. 8, 2020

(54) CONTROLLING THE FORMATION OF IMPERFECTIONS DUE TO POLYMERIC SHRINKAGE DURING MOLDING OPERATIONS

(71) Applicants: Brian Wilson, Greer, SC (US); Jim Endicott, Greenville, SC (US); Chad Lane, Spartanburg, SC (US); Clay Bohn, Mauldin, SC (US)

(72) Inventors: Brian Wilson, Greer, SC (US); Jim Endicott, Greenville, SC (US); Chad Lane, Spartanburg, SC (US); Clay Bohn, Mauldin, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 240 days.

(21) Appl. No.: 15/540,482

(22) PCT Filed: Dec. 31, 2014

(86) PCT No.: PCT/US2014/073003
§ 371 (c)(1),
(2) Date: Jun. 28, 2017

(87) PCT Pub. No.: WO2016/108890
PCT Pub. Date: Jul. 7, 2016

(65) Prior Publication Data
US 2017/0341277 A1 Nov. 30, 2017

(51) Int. Cl.
*B29C 39/40* (2006.01)
*B29C 33/00* (2006.01)
(Continued)

(52) U.S. Cl.
CPC ........ *B29C 39/405* (2013.01); *B29C 33/0061* (2013.01); *B29C 37/005* (2013.01);
(Continued)

(58) Field of Classification Search
CPC ..... B29C 39/405; B29C 39/26; B29C 39/006; B29C 37/005; B29C 33/0061;
(Continued)

(56) References Cited

U.S. PATENT DOCUMENTS

| 1,617,870 A | 2/1927 | Snider |
| 3,219,090 A | 11/1965 | Cislo |

(Continued)

FOREIGN PATENT DOCUMENTS

| DE | 849476 C | 9/1952 |
| FR | 1076635 A | 10/1954 |

(Continued)

OTHER PUBLICATIONS

PCT/US2014/073003 International Search Report and Written Opinion dated Feb. 23, 2015, 14 pages.

*Primary Examiner* — Francisco W Tschen
(74) *Attorney, Agent, or Firm* — Hahn Loeser & Parks LLP; Bret A. Hrivnak

(57) ABSTRACT

Particular embodiments of the invention include apparatus and methods for compensating for shrinkage of a polymeric material in a mold during curing operations. Embodiments of the method include providing a mold comprising a molding cavity defining an interior mold volume separated from an exterior environment and introducing a volume of polymeric material into the molding cavity. Such methods further include impeding the development of a void in the volume of polymeric material by, either: isolating the volume of polymeric material within the molding cavity from the exterior environment, or reducing the interior mold (Continued)

volume of the molding cavity to at least substantially consume a volume of polymeric material shrinkage. Such methods further include curing the polymeric material to form a molded polymeric form.

18 Claims, 6 Drawing Sheets

(51) Int. Cl.
| | |
|---|---|
| *B29C 37/00* | (2006.01) |
| *B29D 30/02* | (2006.01) |
| *B29C 39/00* | (2006.01) |
| *B29C 39/26* | (2006.01) |
| *B60C 7/18* | (2006.01) |
| *B29K 75/00* | (2006.01) |
| *B60C 7/00* | (2006.01) |
| *B29C 67/24* | (2006.01) |

(52) U.S. Cl.
CPC ............ *B29C 39/006* (2013.01); *B29C 39/26* (2013.01); *B29C 39/40* (2013.01); *B29D 30/02* (2013.01); *B60C 7/18* (2013.01); *B29C 67/246* (2013.01); *B29K 2075/00* (2013.01); *B60C 2007/005* (2013.01)

(58) Field of Classification Search
CPC ....... B29C 39/40; B29C 67/246; B29D 30/02; B60C 2007/005; B60C 7/18; B29K 2075/00

See application file for complete search history.

(56) References Cited

U.S. PATENT DOCUMENTS

| | | | |
|---|---|---|---|
| 4,037,635 A | | 7/1977 | Ippen et al. |
| 4,168,771 A | | 9/1979 | Krivec |
| 4,762,739 A | | 8/1988 | Kraus |
| 4,971,737 A | * | 11/1990 | Infanti .................. A23L 3/364 |
| | | | 249/55 |
| 2001/0030382 A1 | * | 10/2001 | Lajza, Jr. .............. B29C 37/005 |
| | | | 264/272.13 |
| 2003/0201043 A1 | | 10/2003 | Adams et al. |
| 2004/0159385 A1 | | 8/2004 | Rhyne et al. |
| 2006/0144488 A1 | | 7/2006 | Vannan |
| 2007/0267116 A1 | | 11/2007 | Rhyne et al. |

FOREIGN PATENT DOCUMENTS

| | | |
|---|---|---|
| GB | 1527261 A | 10/1978 |
| GB | 2052359 A1 | 1/1981 |
| JP | S56144123 A | 11/1981 |
| JP | S5971813 A | 4/1984 |
| JP | S59106936 A | 6/1984 |
| JP | S57205126 A | 12/1984 |
| JP | 5597476 B2 | 10/2014 |
| WO | 9605917 A1 | 2/1996 |
| WO | 2014142916 A1 | 9/2014 |

* cited by examiner

CONTROLLING THE FORMATION OF IMPERFECTIONS DUE TO POLYMERIC SHRINKAGE DURING MOLDING OPERATIONS

BACKGROUND

Field of the Invention

The present subject matter relates generally to methods and apparatus for molding polymers, and more specifically, methods and apparatus for controlling the formation of imperfections due to shrinkage of the polymer during molding operations.

Description of the Related Art

It is of interest to manufacture components from one or more polymers. Operations for manufacturing components from a polymer may include molding and curing the polymer. Polymers that may be molded and cured to form components, include urethane and polyurethane.

In molding and curing a polyurethane component, it is common for the polyurethane to shrink, such as from 1% to 4%, depending on the material and process parameters. This shrinkage may occur before the polyurethane reaches significant mechanical strength. As the curing polyurethane shrinks, it reduces in volume. This reduction in volume resulting from this shrinkage can be displaced by atmospheric air and sometimes mold release, which is a composition applied to the mold to reduce the propensity of the polyurethane to adhere to the mold. This displacement may manifest itself as a void that penetrates the component or causes surface imperfections in the molded form.

These voids can be of particular interest in the process for manufacturing web spokes for non-pneumatic tires, such as the subject of U.S. Patent Application Publication Nos. 2007/0267116 and 2004/0159385. The web spokes for such a non-pneumatic tire extend outwardly from a central hub to an outer band to which the tread attaches. The web spokes are molded using polyurethane, which may undergo a spin casting process, where the polyurethane is introduced into the mold through a circumferential slot in the top of the mold near a hub surface.

Because polyurethane shrinks, as discussed above, voids can form within the mold during molding operations. The voids can manifest in various ways. One way provides a narrow, flat void that separates the polyurethane at a layer just outside the polyurethane, which is cured at the hub surface leaving a very thin layer on the hub adjacent to the void. Another way provides a void that penetrates axially into the polyurethane. Such an axial penetrating void can be positioned anywhere in the polyurethane but is often near the hub. Yet another way provides surface texturing or porosity, or localized dimensional variations when the polyurethane shrinks and separates from a mold surface to form a pocket or void spacing. As used herein, unless otherwise noted, "voids" include any surface voids resulting in surface texture or separation between the molded form and a surface of the mold resulting in localized dimensional variation of the molded form, or porosity or other voids arranged within a thickness of a molded form.

Accordingly, it remains desirable to provide a method and apparatus to impede the formation of voids that may arise when molding polymeric material.

SUMMARY OF THE INVENTION

Particular embodiments of the invention include apparatus and methods for compensating for shrinkage of a polymeric material in a mold during curing operations. Embodiments of the method include providing a mold comprising a molding cavity defining an interior mold volume separated from an exterior environment and introducing a volume of polymeric-material into the molding cavity. Such methods further include impeding the development of a void in the volume of polymeric material by, either: isolating the volume of polymeric material within the molding cavity from the exterior environment, or reducing the interior mold volume of the molding cavity to at least substantially consume a volume of polymeric material shrinkage. Such methods further include curing the polymeric material to form a molded polymeric form.

Embodiments of a polymer molding apparatus comprise a mold, the mold comprising a molding cavity defining an interior mold volume separate from an exterior environment, the molding cavity being adapted to mold a volume of polymeric material. The polymer molding apparatus further includes a shrinkage compensation mechanism operatively arranged in cooperation with the mold, the shrinkage compensation mechanism adapted to: isolate the volume of polymeric material within the molding cavity from the exterior environment, or reduce the interior mold volume of the molding cavity to at least substantially consume a volume of polymeric material shrinkage.

The foregoing and other objects, features, and advantages of the present subject matter will be apparent from the following more detailed descriptions of particular embodiments of the present subject matter, as illustrated in the accompanying drawings wherein like reference numbers represent like parts of the present subject matter.

DETAILED DESCRIPTION OF THE DRAWINGS

DETAILED DESCRIPTION OF PARTICULAR EMBODIMENTS

Figure 1:
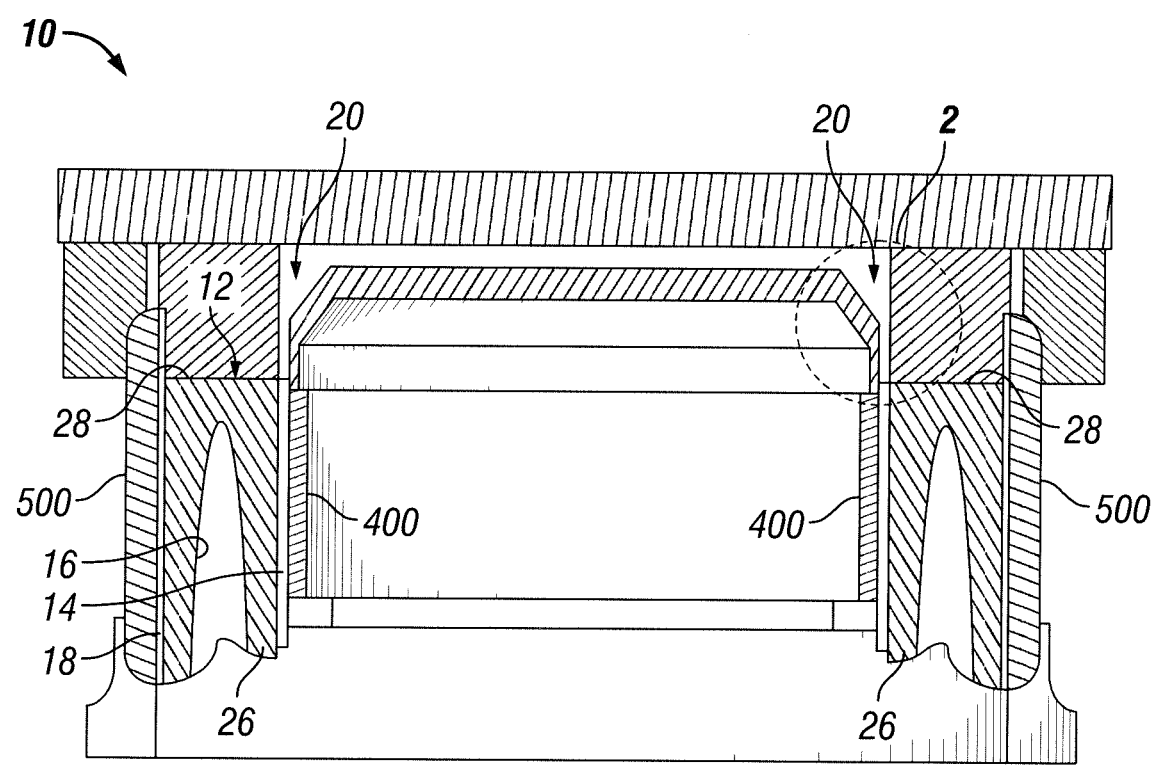
FIG. 1 is a front sectional view of a non-pneumatic tire mold, in accordance with an embodiment of the invention.

Embodiments of the invention include methods of molding a polymer and a polymer molding apparatus to reduce the formation of voids within a molding cavity of the mold, which can include reducing the formation of voids within a molded form of the polymeric material.

Particular embodiments of the invention include methods for molding a polymer, that is, polymeric material. One step of such methods includes providing a mold comprising a molding cavity defining an interior mold volume separated from an exterior environment. The mold may comprise any mold configured to mold polymeric material. For example, the mold may comprise a tire or tread mold, such as a mold for forming non-pneumatic tires, or even wheel or rim molds. A mold for a non-pneumatic tire mold may comprise a molding cavity having different regions, which include a hub-attachment portion, a web spoke molding portion, and a band-attachment portion. In particular embodiments, the mold includes one or more fluid passages extending outward from the molding cavity any of a variety of locations. For example, one such fluid passage is an inlet for receiving polymeric material in a fluid or viscous form, the inlet may be in direct communication with the molding cavity or a passage may extend between the inlet and the molding cavity. By further example, another fluid passage is a vent for releasing any gases or excess fluid from the molding cavity. In certain embodiments, an inlet is not present, where instead the polymeric material is arranged within the molding cavity when the mold is in an open configuration. While the molding cavity may comprise any desired cavity for molding polymeric material, the cavity defines an interior volume separate from an exterior environment. The exterior environment may comprise any environment including a fluid, whether the fluid comprises one or more liquids or gases.

In certain embodiments of such methods for molding a polymer, one step comprises introducing a volume of polymeric material into the molding cavity. This step may be achieved by any manner known to one of ordinary skill in the art. For example, as suggested above, the volume of polymeric material may be deposited into an inlet and subsequently flow into the molding cavity or the volume of polymeric material may be placed within the molding cavity when the mold is in an open configuration.

Another step of such methods includes a step of impeding the development of a void in the volume of polymeric material. In particular embodiments, this may be achieved by either: isolating the volume of polymeric material within the molding cavity from the exterior environment, and/or reducing the interior mold volume of the molding cavity to substantially consume a volume of polymeric material shrinkage. It is appreciated that isolating the volume of polymeric material within the molding cavity from the exterior environment may be performed using any process that results in closing a fluid passage providing communication between the molding cavity and the exterior environment. The fluid passage may comprise an aperture or elongate volume extending between an inlet and the molding cavity, for example. It is also appreciated that reducing the interior mold volume of the molding cavity to substantially consume a volume of polymeric material shrinkage may be performed using any process that results in reducing the volume of a molding cavity to account for at least a portion of any shrinkage that the polymeric material will undergo during molding operations. It is appreciated that a reduction in the interior mold volume may be targeted to address a local or isolated reduction in volume of polymeric material due to local shrinkage attained during a curing operation, or the reduction in the interior mold volume may be employed to account for the global or entire reduction in volume of polymeric material achieved due to all shrinkage attained during a curing operation.

In particular embodiments, the step of impeding is accomplished by a shrinkage compensation mechanism. For example, in certain instances the shrinkage compensation mechanism is an expandable membrane. In certain instances, the expandable membrane is an expandable sealing membrane, which expands to substantially close a fluid passage, such as an inlet or vent, in fluid communication with the molding cavity. In other instances, the expandable membrane is an expandable void-consuming membrane, which expands to substantially consume a volume of the molding cavity. By further example, the shrinkage compensation mechanism is a translatable member. In certain instances, the translatable member is a translatable sealing member, which translates to substantially close a fluid passage, such as an inlet or vent, in fluid communication with the molding cavity. In other instances, the translatable member is a translatable void-consuming member, where the translatable void-consuming member translates to substantially consume a volume of the molding cavity. This consumption may displace polymeric material arranged within the mold or may consume a volume of the molding cavity unoccupied by the polymeric material as a result to the polymeric material shrinking during curing operations. A translatable void-consuming member may include one or more projections, which may operate as a plug to both seal a fluid passage in fluid communication with the molding cavity and consume a volume of the molding cavity. Actuating any shrinkage compensation mechanism to perform any such step may be performed using any process that results in expansion or translation of any such mechanism. In particular embodiments, a translatable void-consumption member extends further into the molding cavity as the polymeric material shrinks during curing operations, for the purpose of consuming unoccupied mold volume generated by the reduction of polymeric material volume as the polymeric material shrinks. It is appreciated that translation may be manually controlled and performed or controlled and performed through automation using any known programmable logic controller or processor. It is appreciated that a translatable member may comprise any one or more of the translatable members described herein. For example, in particular embodiments, a translatable member may comprise both a translatable sealing member and a translatable void-consuming member.

Particular embodiments of the step of impeding is achieved by compressing the mold cavity using a mold closure operation, where opposing mold components articulate between mold open and mold closed configurations. In the mold closed configuration, the opposing mold members articulate between an initially closed configuration and a compressed configuration, where the molding cavity volume compresses from an initial volume to a reduced volume. When opposing mold components initially engage to form initially close the mold and form an initial volume of the mold cavity, the mold is in a substantially closed configuration. To account for any mold cavity volume unoccupied by polymeric material, the mold closes further to reduce the volume of the mold cavity to define a reduced-volume molding cavity, where the mold is in a compressed, closed configuration. In exemplary embodiments, a compressible member may be used to facilitate compression of the molding cavity volume. For example, in particular instances, at least one compressible seal having one or more voids is arranged between the opposing mold members, the compressible seal compressing between the initially closed configuration and the compressed configuration, where compressed configuration, the seal is thinner than in the initially closed configuration.

Impeding the development of voids in the polymer being molded and cured may be done using one or more of the above methods. In some methods for molding a polymer the development of voids in the polymer is impeded by eliminating one or more free surfaces of the polymer. Without limitation, eliminating one or more free surfaces of the polymer may be accomplished by closing a fluid passage which provides communication between the molding cavity and the exterior environment using any described method of isolating the volume of polymeric material within the molding cavity from the exterior environment. In some of such methods, the development of voids in the polymer is impeded by removing some, all, or substantially all of the gases or air at one or more free surfaces of the polymer by reducing the interior mold volume or applying a force or load to the polymer. In some of such methods, development of voids in the polymer is impeded by reducing the volume of the molds and/or applying pressure to the volume of polymeric material to compensate for shrinkage.

Embodiments of such methods include curing the polymeric material to form a molded polymeric form. Such curing may be accomplished by any manner known to one of ordinary skill. For example, in certain curing operations, heat and/or pressure is used to facilitate curing of the polymeric material. In other curing operations, such as when the polymeric material is a thermosetting polymeric material, curing is achieved by way of a chemical reaction in lieu of heat and pressure, although elevated heat may be used to ensure chemical reaction sufficiently endures to provide a desired cure. As a result of a curing operation, polymeric material shaped by the mold is transformed from a liquid or viscous uncured state to a cured form, which may be rigid or elastic, for example. Using the methods outlined above, a molded form is generated where the generation of voids are locationally or globally controlled, and even reduced or eliminated. It is appreciated that, in particular embodiments, the step of impeding may be performed prior to and/or during the step of curing.

Without limitation, the volume of polymeric material may comprise any polymeric material, which may or may not be reinforced with one or more materials, such as cord or fibers, for example. In particular instances, for example, polymeric material comprises a thermoset polymeric material, such as a thermosetting plastic. In exemplary embodiments, the thermoset is a urethane or polyurethane.

Particular embodiments of the methods discussed above will now be described in further detail below in association with exemplary embodiments shown in the figures.

In an exemplary embodiment shown in FIG. 1, a polymer mold 10 is shown to include a molding cavity 12. Molding cavity 12 includes different regions, which include a hub-attachment portion 14, a web spoke molding portion 16, and a band-attachment portion 18. In the hub-attachment portion 14, the volume of polymeric material is molded to an annular hub 400 and ultimately to the web spokes formed in the web spoke molding portion 16 during molding operations. In the band-attachment portion 18, the volume of polymeric material is molded to an outer annular band 500 and ultimately to the web spokes formed in the molding cavity during molding operations. A fluid passage comprising an inlet 20 for introducing a volume of polymeric material in an uncured form is also provided. It is appreciated that one or more inlets may be provided for any mold, or a continuous annular inlet may be provided, such as is exemplarily shown. It is also appreciated that all shrinkage compensating mechanisms discussed herein with regard to an inlet in the exemplary embodiments shown in the figures may also be used in association with other fluid passages of the mold, where any such fluid passage is in fluid communication with a molding cavity, such as any vent, for example, as suggested above in association with the methods. It is also appreciated that any shrinkage compensating mechanism discussed in this application may be used alone or in combination with any one or more other shrinkage compensating mechanism.

Figure 2:
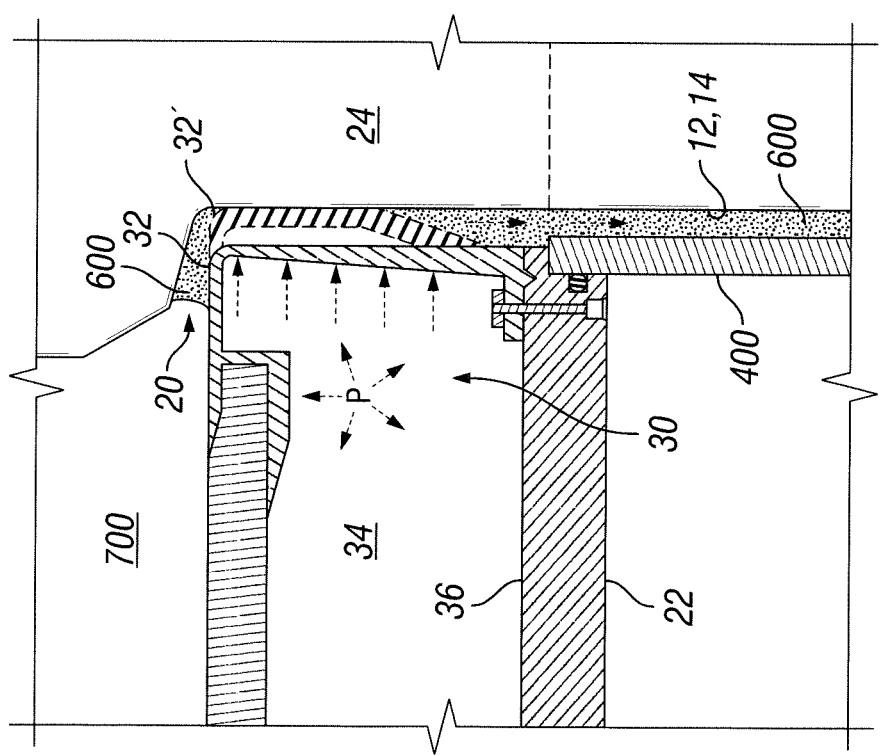
FIG. 2 is an enlarged view of Section 2 as shown in FIG. 1.

With reference now to FIG. 2, an enlarged view of region 2 in FIG. 1 shows in greater detail an inlet 20 of the mold for directing uncured polymeric material into the molding cavity 12, the inlet being arranged between a first mold component 22 and a second mold component 24. The first component 22 as a cap in the embodiment shown to maintain the annular hub 400 in a position relative to the molding cavity 12. Molding cavity 12 defines an interior mold volume separate from an exterior environment 700, which may or may not comprise atmospheric conditions. Mold 10 also includes a shrinkage compensation mechanism 30 for controlling void formation within the molding cavity. In the embodiment shown, mechanism 30 is an expandable sealing membrane 32 shown in both unexpanded and expanded forms, the expanded form being identified as 32'. Polymeric material 600, in an uncured form, is shown being inserted or poured into the molding cavity through inlet 20, the flow of which is indicated by various arrows. Mechanism 30 is used to separate and isolate a volume of polymeric material within the molding cavity 12 from the exterior environment 700. By doing so, the atmosphere will not penetrate the molding cavity and any of the polymeric material arranged therein. To separate and isolate the volume of polymeric material 600 within the molding cavity 12 from exterior environment 700, the expandable sealing membrane 32 expands to an expanded form 32' to close a passage comprising any portion of the inlet 20 or molding cavity 12, or any portion extending there between, thereby sealing the passage and preventing any fluid flow, including any flow of polymeric material 600 or exterior environment 700 into the molding cavity. In the embodiment shown, the expandable sealing membrane 32 is actuated, that is expanded to a desired expanded shape 32', using a fluid 34, which may comprise any desired fluid, including pressurized gas or air, water, or oil, for example. Fluid 34 is arranged within a fluid chamber 36 of the first component 22 of the mold, which comprises a central mold cap in the present embodiment. In closing the passage into the molding cavity, it is anticipated that a portion of the polymeric material may remain on the atmospheric side of the seal, that is, outside the molding cavity to ensure that no atmosphere or other gas is arranged in the molding cavity. It is appreciated that in lieu of the expandable sealing membrane contacting an opposing side of a mold along a mold component use to form a portion of the molding cavity, mechanism may contact another mechanism or any other member or portion of the mold. In the embodiment shown in FIG. 2, the first component 22 of the mold 10 is more specifically referred to as a pour cap, but it is understood that the first component of a mold may comprise any other portion of a mold.

Figure 3:
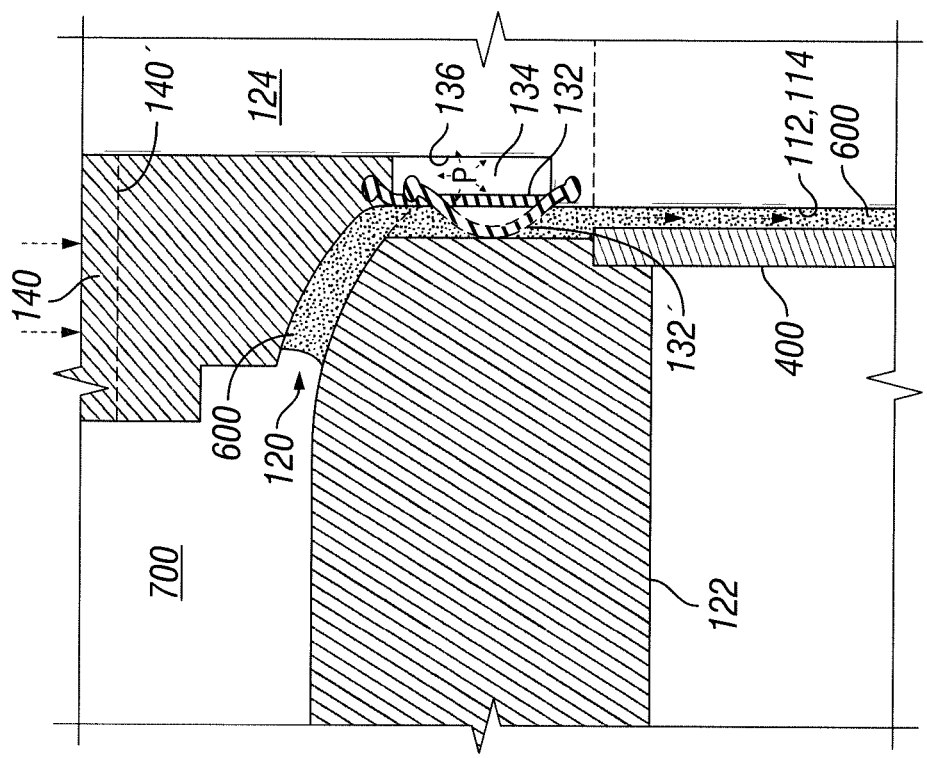
FIG. 3 is a partial front sectional view an alternative embodiment of the mold shown in FIG. 2.

With reference to FIG. 3, an enlarged view of region 3 in FIG. 1 shows in greater detail a mold 110 having a first component 122 and a second component 124 and an alternative shrinkage compensation mechanism 130 for controlling void formation within the molding cavity. The first component 122 as a cap in the embodiment shown to maintain the annular hub 400 in a position relative to the molding cavity 112. In the embodiment shown, mechanism 130 includes an expandable sealing membrane 132 similar in operation to membrane 32 discussed above, one exception being that it extends from the other side of the mold and the passage through which polymeric material passes from an inlet 120. As with mechanism 30, mechanism 130 is used to separate and isolate a volume of polymeric material within the molding cavity 112 from the exterior environment 700. The expandable membrane is shown in both unexpanded and expanded forms, the expanded form being identified as 132'. To separate and isolate the volume of polymeric material 600 within the molding cavity 112 from exterior environment 700, the expandable sealing membrane 132 expands to an expanded form 132' to close a passage comprising any portion of the inlet 120 or molding cavity 112, or any portion extending there between, thereby sealing the passage and preventing any fluid flow, including any flow of polymeric material 600 or exterior environment 700 into the molding cavity. In the embodiment shown, the expandable sealing membrane 132 is actuated, that is expanded to a desired expanded shape 132', using a fluid 134, which may comprise any desired fluid, including pressurized gas or air, water, or oil, for example. Fluid 134 is arranged within a fluid chamber 136 of the second component 124 of the mold, which comprises a web spoke molding portion in the present embodiment. In closing the passage into the molding cavity, it is anticipated that a portion of the polymeric material may remain on the atmospheric side of the seal, that is, outside the molding cavity to ensure that no atmosphere or other gas is arranged in the molding cavity. It is appreciated that in lieu of the expandable sealing membrane contacting an opposing side of a mold along a mold component use to form a portion of the molding cavity, mechanism may contact another mechanism or any other member or portion of the mold.

With continued reference to the embodiment in FIG. 3, in addition to the expandable member 132 engaging an opposing side of the mold to close the passage, shrinkage compensation mechanism 130 includes a translatable member 140 of the mold 110 is shown both in an open position as well as a closed position 140'. The translatable member 140 is a translatable sealing member configured to move to a closed position to separate and isolate a volume of polymeric material within the molding cavity 112 from the exterior environment 700. In the embodiment shown in FIG. 3, this is done in addition to the use of expandable sealing membrane 132, but may also, in other embodiments, be used without membrane 132 or may be used in conjunction with the expandable sealing membrane 32 shown in FIG. 2 or any other expandable sealing membrane contemplated herein that is configured to separate and isolate a volume of polymeric material within the molding cavity from the exterior environment.

Figure 4:
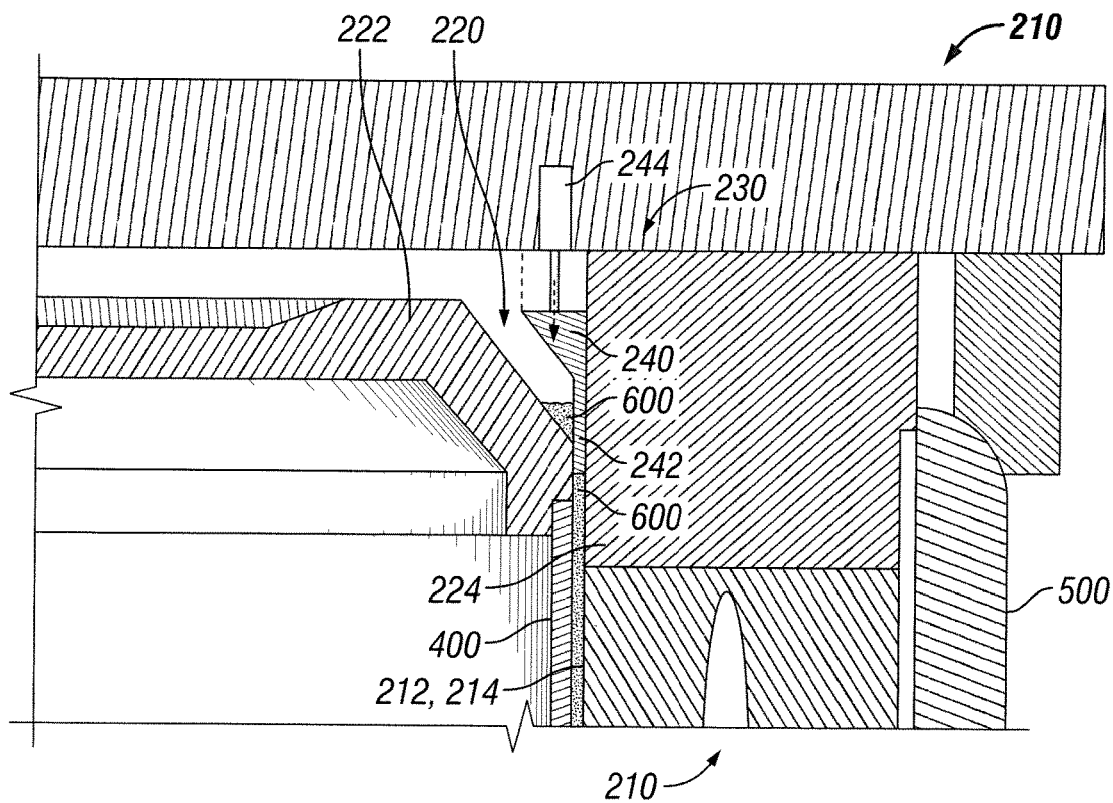
FIG. 4 is a partial front sectional view of yet another alternative embodiment of the mold shown in FIG. 2.

In another embodiment shown in FIG. 4, regarding mold 210, a shrinkage compensation mechanism 230 is shown to comprise a translatable member 240. Translatable member 240 is similar in function to the translatable member 140 shown in FIG. 3 as it also seals the inlet into a molding cavity, but operates without the concurrent use of a separate, independent expandable sealing membrane 132, yet could in other embodiments.

Translatable member 240 includes a projection 242 that operates as a plug by extending into a fluid passage 250 in a direction of the fluid flow to prevent fluid flow through the passage, the fluid passage extending between a fluid inlet 220 and the molding cavity 212 and arranged between a first mold member 222 and a second mold member 224. It is appreciated that one or more projections may be employed to close the passage and stop fluid flow. In this way, translatable member 240 differs from translatable member 140, where translatable member 140 closes a passage by extending in a direction generally transverse to the fluid flow. It is appreciated that any projection 240 may be configured to only seal the inlet, consume molding cavity volume, or both seal the inlet and consume molding cavity volume. In any event, each translatable member articulates between open and close configurations, where in the open configuration at least fluid from the external environment is able to pass from an inlet and to a molding cavity within the mold through a passage, and where in the closed configuration uncured polymeric and fluid from the external environment is unable to pass from an inlet and to a molding cavity through the passage.

It is appreciated that when actuated, translatable member 240, or any other translatable member contemplated herein, may extend into the volume of the molding cavity, to thereby reduce the interior mold volume, and thereby operate as a translatable void-consuming member. The translatable member 240 with or without projection 242 may also be configured to consume a portion of the molding cavity, to displace polymeric material or to consume unoccupied molding cavity volume generated by shrinking polymeric material. This may be beneficial when necessary to account and control any shrinkage of the polymeric material during curing operations, so to consume and fill any anticipated void that may arise within the molding cavity. When extending into the molding cavity, in particular instances, the translatable sealing member contacts the polymeric material therein to apply pressure to and even displace the volume of polymeric material as needed to control shrinkage and deter the formation of voids within the mold and the cured polymeric material.

With continued reference to the embodiment in FIG. 4, an actuator 244 is shown configured to translate translatable sealing member 240 between open and closed configurations. It is appreciated that one or more actuators may be employed in any embodiment. In translating the translatable member 240 by any means, in particular embodiments, the translatable member is translated further into the mold as the polymeric material shrinks, for the purpose of consuming the mold volume generated by the reduction of polymeric material volume as the polymeric material shrinks. The same can be said for translatable sealing member 140 (see FIG. 3) in particular embodiments. Method of advancing a translatable member (such as 140, 240) and its projection 242 further into the molding cavity 212 as the polymeric material shrinks during curing operations may be manually performed or performed through automation using any known programmable logic controller or processor.

It is appreciated that, in any embodiment, any translatable sealing member described or contemplated herein, including translatable members 140 and 240, may comprise a ring extending annularly around the mold, so to close the fluid communication between the inlet and the molding cavity concurrently around the mold, but the translatable sealing member may comprise one or more structures to achieve the stated purpose of closing the fluid communication between the inlet and the molding cavity as necessary, regardless as to whether the inlet extends annularly around the mold. To better close fluid passage and isolate the molding cavity from the exterior environment, it is appreciated that any translatable sealing member may include a compliant or deformable surface or member to more compliantly engage an opposing portion of the mold for improved sealing capabilities. Finally, any translatable sealing member may be actuated using any known or desired actuator, which may be operated by a fluid, such as water, oil, or pressurized gas, and which is translatable or extendable.

Figure 5:
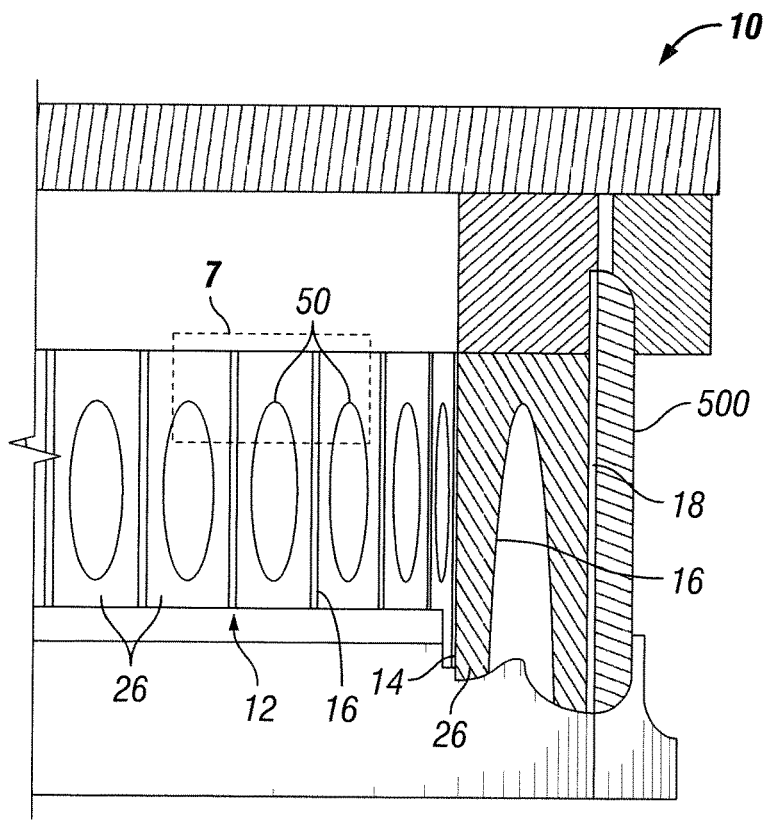
FIG. 5 is partial front sectional view of an embodiment of a mold in accordance with an embodiment of the invention.
Figure 6:
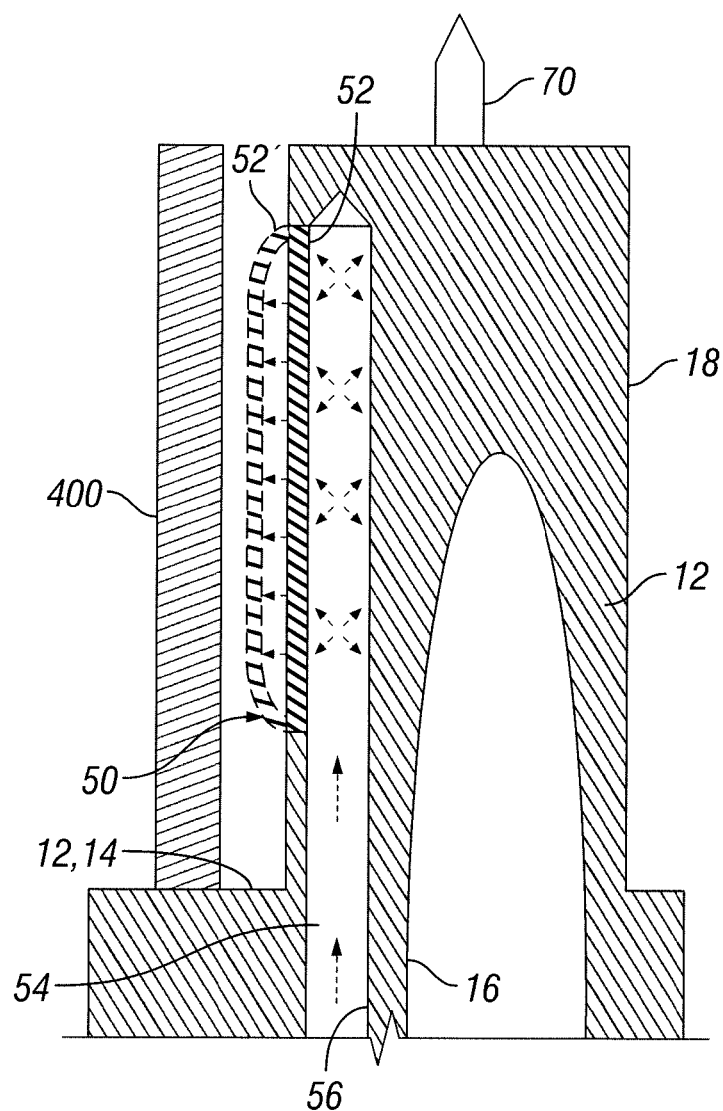
FIG. 6 is a side sectional view of a web spoke molding member of the mold shown in FIG. 5.

With reference to FIGS. 5-6, another shrinkage compensation mechanism 50 is shown for controlling void formation within the molding cavity. This mechanism is configured to extend into the volume of the molding cavity to reduce the molding cavity volume, which may account for and control any local or global shrinkage of the polymeric material during curing operations, so to consume and fill any anticipated void that may arise within the molding cavity when the polymeric material shrinks and retreats from a molding surface of the molding cavity. When extending into the molding cavity, in particular instances, the mechanism contacts the polymeric material therein to apply pressure to and even displace the volume of polymeric material as needed to control shrinkage and deter the formation of voids within the mold and the cured polymeric material.

In the embodiment of FIGS. 5-6, the shrinkage compensation mechanism 50 is an expandable void-consuming membrane 52 that operates to expand and retract in similar fashion to expandable sealing membranes 32, 132 discussed above, one exception being that it does not stop flow within a passage but rather consumes molding cavity volume to deter the formation of voids within the molding cavity. Expandable void-consuming membrane 52 is shown in FIG. 6 in a relaxed state and an expanded state, which is referred to as 52'. Shrinkage compensation mechanism 50 can expand to reduce the interior mold volume, or apply pressure to a polymer therein, or both. In the embodiment shown, a fluid 54 contained within a fluid chamber 56 is employed to expand membrane 52. As a result, actuation of shrinkage compensation mechanism 50 may act to force air, mold release or other non-polymer fluid out the region into which the mechanism expands. In the embodiment shown, the shrinkage compensation mechanism 50 is positioned along the hub-attachment portion 14 of the molding cavity 12 between web spoke molding portions 16 of the molding cavity. In other variations, one or more shrinkage compensation mechanisms 50 are arranged additionally, or in the alternative, at other locations within a mold to consume molding cavity volume as desired to locally or globally curb the formation of voids within a mold and along and/or within the molded polymeric material. Any such mechanism 50 may comprise any expandable membrane, such as is shown in the exemplary embodiment or as discussed in association with any expandable sealing membrane discussed herein, or a translatable void-consuming member, which would comprise a rigid surface of the molding cavity that translates in into the molding cavity in any manner discussed or contemplated in association with any translatable sealing member discussed herein.

Figure 7:
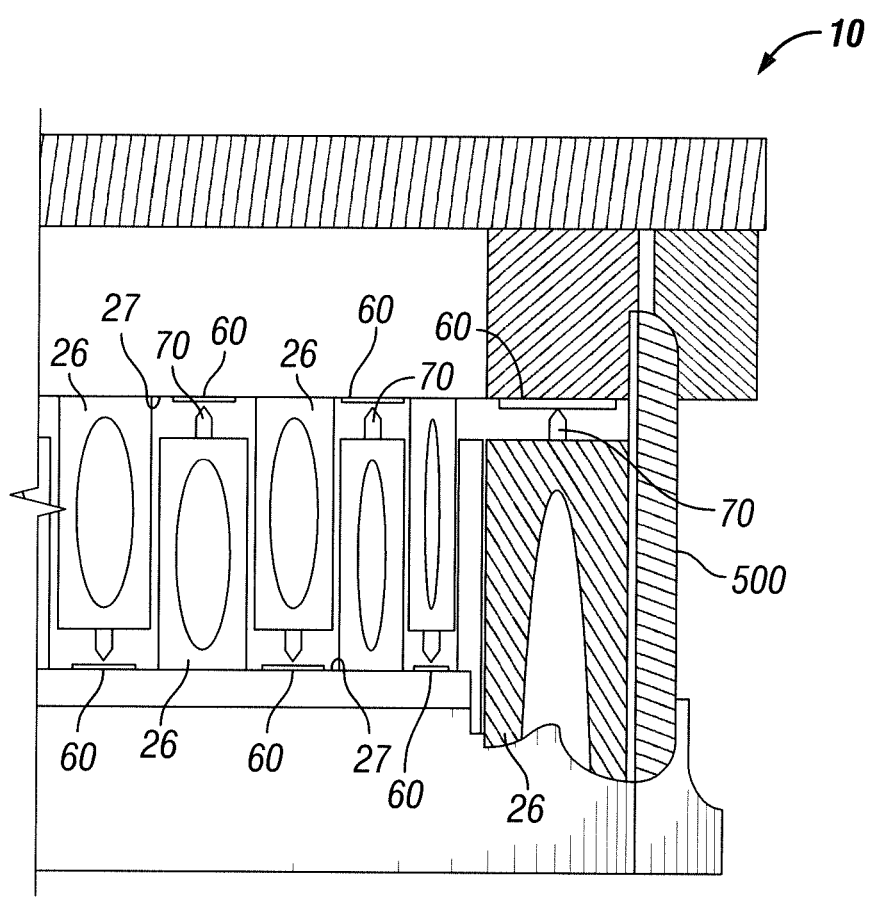
FIG. 7 is a partial front sectional view of the mold shown in Section 7 of FIG. 5 including seals, in accordance with an embodiment of the invention.
Figure 8:
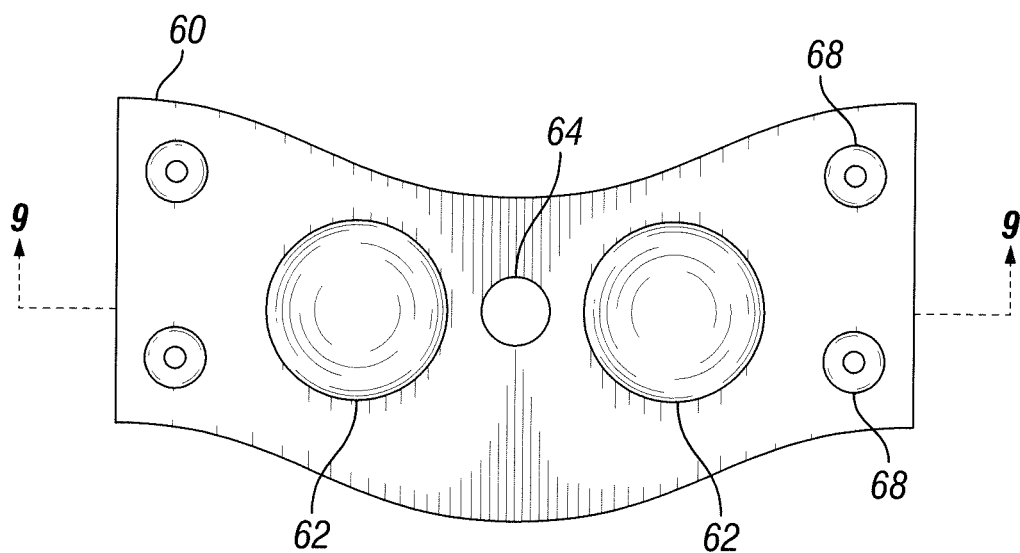
FIG. 8 is a top view of the seal shown in FIG. 7.
Figure 9:
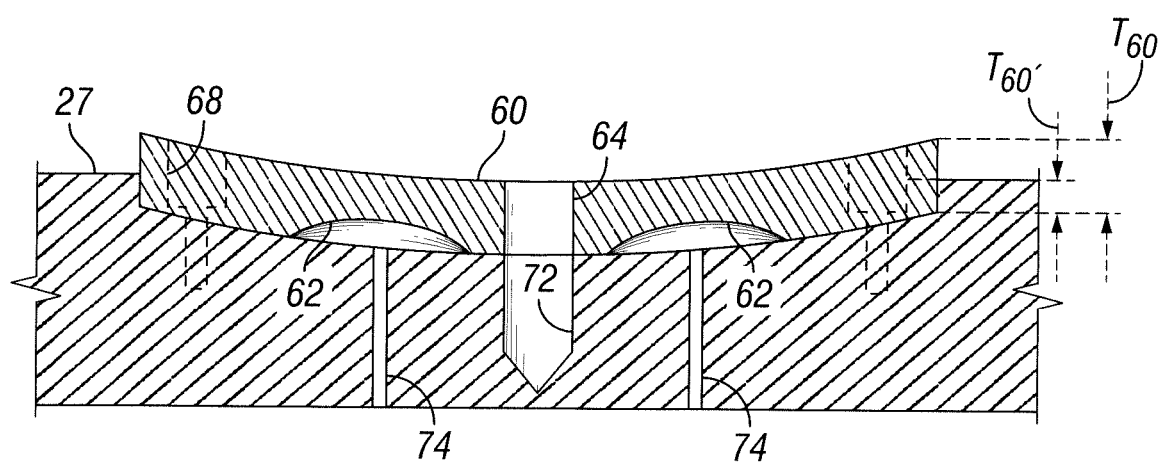
FIG. 9 is a section view of the seal of FIG. 8 shown arranged within the mold of FIG. 7.

In exemplary embodiment shown in FIGS. 7-9 shown is a void-reducing seal 60 (a compressible member) arranged at an interface between opposing mold members that articulate between open and close configurations to at least partially define a portion of the molding cavity. The void-reducing seal 60 is configured to be deflected to reduce the mold cavity volume from an initial volume to a reduced volume. With the seal arranged on one of the pair of opposing mold members, the initial volume of the mold cavity is defined when the seal is initially engaged by the other of the pair of opposing mold member. When initially engaged to form the initial volume of the mold cavity, the mold is in a substantially closed configuration. To account for any mold cavity volume unoccupied by polymeric material, the mold closes further by deflecting the void-reducing seal to reduce the volume of the mold cavity to define a reduced-volume molding cavity, where the mold is in a compressed, closed configuration. For example, current EPDM seals are known to compress up to 0.3 millimeters (mm). The inventive void-reducing seals, however, are configured to compress at least 2 mm, substantially. By doing so, the molding cavity is able to be compressed by at least 2 mm, which results in a like reducing in molding cavity volume. As with any translatable member discussed herein, the mold may be further closed by deflecting the void-reducing seal to reduce the molding cavity volume as the polymeric material shrinks during curing operations. For example, the mold may be further closed to reduce the molding cavity volume at a rate substantially equal to the rate by which the polymeric material shrinks.

In the exemplary embodiment shown in FIGS. 7-9, the opposing pair of mold components comprise a web spoke-forming member 26 and a base portion 27, which articulate from an open mold configuration to a closed mold configuration. To facilitate sealing of the web spoke-forming member portion of the molding cavity, a void-reducing seal 60 is provided, which may be formed of any desired compressible material. For example, the void-reducing seal may comprise an elastic material, such as any natural or synthetic rubber. In particular embodiments, the seal is formed of ethylene propylene diene monomer (EPDM). To facilitate sufficient deflection of the seal, and thereby achieve a desired reduction in molding cavity volume, one or more voids 62 may be arranged within the thickness $T_{60}$ of the seal. The voids may be arranged along any surface or fully contained within the thickness of the seal. The voids may also extend partially (shown) or fully through the seal. The one or more voids 62 provide a sufficient volumetric void into which the seal may deform to allow the seal thickness $T_{60}$ to be reduced to a narrower thickness $T_{60}'$. In the example shown, if a void-reducing seal is arranged at all interfaces 28 around the mold, then the volumetric void of the molding cavity may be reduced to account for any shrinkage of the polymeric material during curing operations. To prevent any gases contained within any seal void from being forced back into the polymeric material due to increased pressure, one or more vents 74 may be provided extending through any mold portion adjacent the seal void, such as base 27 in FIG. 9, and to atmosphere or any other desired location. While the vent holes may be any desired size, in particular embodiments, the vent holes are 2.5 mm to 4 mm wide. It is appreciated that the seal may be affixed in any manner to the mold, which includes the use of welds, fasteners, or heat-resistant adhesives.

In FIG. 7, the mold is shown to include a plurality of male guide members 70 to facilitate proper alignment of the opposing mold members during mold opening and closing operations. In such embodiments, a corresponding aperture 72 (shown in FIG. 9) is arranged in the opposing mold member to receive the guide member and a passage 64 (shown in FIGS. 8 and 9) is arranged within the seal 60 to facilitate the mating between guide member 70 and aperture 72. Moreover, to accommodate the additional closure of the mold, as described in association with void-reducing seals, any such guide member may be lengthened to account for a longer stroke or articulation between open and closed mold configurations, which in the closed mold configuration, the mold articulates between an initial closed configuration to a compressed configuration.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the present subject matter. Ranges that are described as being "between a and b" are inclusive of the values for "a" and "b" unless otherwise specified.

While the present subject matter has been described with reference to particular embodiments thereof, it shall be understood that such description is by way of illustration only and should not be construed as limiting the scope of the claimed invention. Accordingly, the scope and content of the present subject matter are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method of molding a polymer comprising:
providing a mold comprising a molding cavity defining an interior mold volume separated from an exterior environment;
introducing a volume of polymeric material into the molding cavity;
impeding the development of a void in the volume of polymeric material by isolating the volume of polymeric material within the molding cavity from the exterior environment;
wherein the step of impeding is accomplished by a shrinkage compensation mechanism, where the shrinkage compensation mechanism is a translatable member arranged in association with a fluid passage, the fluid passage being in fluid communication with the mold cavity, where the translatable member forms a translatable sealing member, where the translatable sealing member is configured to translate between an open position and a closed position to substantially close a fluid passage in fluid communication with the molding cavity such that the translatable member substantially separates and isolates the molding cavity from the exterior environment; and,
consuming a volume of the molding cavity using the shrinkage compensation mechanism;
curing the polymeric material to form a molded polymeric form.

2. The method of claim 1, where the translatable member is a translatable sealing member, where the translatable sealing member translates to substantially close a fluid passage in fluid communication with the molding cavity.

3. The method of claim 1, where the translatable member is also a translatable void-consuming member, where the translatable void-consuming member translates into the molding cavity to substantially consume a volume of the molding cavity.

4. The method of claim 1, where the step of impeding is achieved by compressing the mold cavity using a mold closure operation, where opposing mold components articulate between mold open and mold closed configurations, and where in the mold closed configuration, the opposing mold members articulate between an initially closed configuration and a compressed configuration, where the molding cavity volume compresses from an initial volume to a reduced volume.

5. The method of claim 4, where a compressible seal having one or more voids is arranged between the opposing mold members, the compressible seal compressing between the initially closed configuration and the compressed configuration.

6. The method of claim 1, where the step of impeding occurs during the step of curing.

7. The method of claim 1, where the polymeric material is polyurethane.

8. A polymer molding apparatus comprising:
a mold comprising a molding cavity defining an interior mold volume separate from an exterior environment, the molding cavity being adapted to mold a volume of polymeric material; and
a shrinkage compensation mechanism operatively arranged in cooperation with the mold, the shrinkage compensation mechanism adapted to isolate the volume of polymeric material within the molding cavity from the exterior environment and to consume a volume of the molding cavity; and
wherein the shrinkage compensation mechanism is a translatable member arranged in association with a fluid passage, the fluid passage being in fluid communication with the mold cavity, where the translatable member forms a translatable sealing member, where the translatable sealing member is configured to translate between an open position and a closed position to substantially close a fluid passage in fluid communication with the molding cavity such that the translatable member substantially separates and isolates the molding cavity from the exterior environment.

9. The polymer molding apparatus of claim 8, where the translatable member is also a translatable void-consuming member, where the translatable void-consuming member is configured to translate into the molding cavity to substantially consume a volume of the molding cavity.

10. The polymer molding apparatus of claim 9, where the translatable member is configured to extend into the molding cavity from the fluid passage.

11. The polymer molding apparatus of claim 8, where a compressible seal is arranged between opposing mold components articulating between mold open and mold closed configurations to at least partially define the molding cavity, where in the mold closed configuration, the opposing mold members articulate between an initially closed configuration and a compressed configuration, where in the initially closed configuration the molding cavity volume has an initial volume and in the compressed configuration the molding cavity has a reduced volume, where the initial volume is greater than the compressed volume.

12. The polymer molding apparatus of claim 8, where the translatable member is configured to extend into the molding cavity from the fluid passage.

13. The polymer molding apparatus of claim 8, where the translatable member includes a projection that operates as a plug when in the closed position.

14. The polymer molding apparatus of claim 13, where the projection is extended in the fluid passage in a direction of intended fluid flow through the fluid passage.

15. The polymer molding apparatus of claim 8, where the translatable member translates in a direction transverse to the intended direction of fluid flow through the fluid passage.

16. The polymer molding apparatus of claim 8, where the translatable member is arranged along one of opposing mold components articulating between mold open and mold closed configurations to at least partially define the molding cavity.

17. The polymer molding apparatus of claim 8, where the fluid passage is an inlet for fluidly introducing polymeric material into the molding cavity.

18. The polymer molding apparatus of claim 8, where the fluid passage is a mold vent.

\* \* \* \* \*